(12) United States Patent  
Masuda et al.

(10) Patent No.: US 9,341,222 B2
(45) Date of Patent: May 17, 2016

(54) ELECTRIC PARKING BRAKE

(71) Applicants: Yui Masuda, Shizuoka (JP); Makoto Muramatsu, Shizuoka (JP)

(72) Inventors: Yui Masuda, Shizuoka (JP); Makoto Muramatsu, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/391,174

(22) PCT Filed: Mar. 26, 2013

(86) PCT No.: PCT/JP2013/058709
§ 371 (c)(1),
(2) Date: Oct. 8, 2014

(87) PCT Pub. No.: WO2013/161486
PCT Pub. Date: Oct. 31, 2013

(65) Prior Publication Data
US 2015/0041261 A1 Feb. 12, 2015

(30) Foreign Application Priority Data

Apr. 24, 2012 (JP) ................................. 2012-098521

(51) Int. Cl.
*B60L 7/00* (2006.01)
*F16D 66/00* (2006.01)
(Continued)

(52) U.S. Cl.
CPC ............... *F16D 66/00* (2013.01); *B60T 13/741* (2013.01); *B60T 17/221* (2013.01); *F16D 65/14* (2013.01); *F16D 65/18* (2013.01); *F16D 2066/003* (2013.01); *F16D 2121/24* (2013.01);

(Continued)

(58) Field of Classification Search
CPC ......... F16D 65/14; F16D 65/18; F16D 66/00; F16D 2055/0062; F16D 2065/386; B60T 1/005; B60T 1/10; B60T 13/746
See application file for complete search history.

(56) References Cited

U.S. PATENT DOCUMENTS 6,315,092 B1   11/2001  Schwarz
2003/0226407 A1*  12/2003  Tomita ..................... G01F 1/24
                                                     73/861.57

(Continued)

FOREIGN PATENT DOCUMENTS

JP    2001-524647    12/2001
JP    2007-137182     6/2007
JP    2010-054010     3/2010

OTHER PUBLICATIONS

International Search Report issued Jun. 25, 2013 in International (PCT) Application No. PCT/JP2013/058709.

(Continued)

*Primary Examiner* — Christopher Schwartz
(74) *Attorney, Agent, or Firm* — Wenderoth, Lind & Ponack, L.L.P.

(57) ABSTRACT

A parking brake has the function of monitoring a malfunction of the parking brake, thereby preventing accidents. The parking brake includes an electric motor and a linear motion mechanism which are connected together through a speed reduction mechanism. The parking brake further includes a locking pin which can be brought into engagement with the speed reduction mechanism by a solenoid. The parking brake further includes a monitor for detecting a change in reactance of the solenoid. Since the change in reactance as detected corresponds to a displacement of a plunger, it is possible to prevent accidents by monitoring deteriorated sliding properties of the locking pin based on the displacement detected.

10 Claims, 9 Drawing Sheets

(51) Int. Cl.
  *B60T 13/74* (2006.01)
  *B60T 17/22* (2006.01)
  *F16D 65/18* (2006.01)
  *F16D 65/14* (2006.01)
  *F16D 121/24* (2012.01)
  *F16D 125/40* (2012.01)
  *F16D 125/50* (2012.01)
  *F16D 127/06* (2012.01)

(52) U.S. Cl.
  CPC ......... *F16D2125/40* (2013.01); *F16D 2125/50* (2013.01); *F16D 2127/06* (2013.01)

(56) References Cited

U.S. PATENT DOCUMENTS

| | | | | |
|---|---|---|---|---|
| 2005/0173206 A1* | 8/2005 | Reuter | .................... | F16D 65/18 188/72.7 |
| 2005/0217952 A1* | 10/2005 | Usui | ....................... | F16D 65/18 188/265 |
| 2005/0258683 A1* | 11/2005 | Yamaguchi | ............. | B60T 1/005 303/89 |
| 2007/0062764 A1* | 3/2007 | Takahashi | ............. | B60T 13/746 188/1.11 E |
| 2007/0114843 A1* | 5/2007 | Kawahara | ................. | B60T 7/12 303/122 |
| 2008/0059023 A1* | 3/2008 | Ueno | ........................ | B60T 1/10 701/36 |
| 2010/0051395 A1* | 3/2010 | Sano | ....................... | B60T 1/005 188/162 |

OTHER PUBLICATIONS

Written Opinion of the International Searching Authority issued Jun. 25, 2013 in International (PCT) Application No. PCT/JP2013/058709 (with English translation).

\* cited by examiner

ELECTRIC PARKING BRAKE

BACKGROUND OF THE INVENTION

1. Technical Field

This invention relates to an electric parking brake having a monitoring function.

2. Background Art

FIG. 8 shows an electric disk brake disclosed in the below-identified Patent document 1.

This electric disk brake includes an electric motor 1 and a linear motion mechanism 2 that are connected together through a speed reduction mechanism 3, and is configured such that the rotary motion of the motor 1 is transmitted to the linear motion mechanism 2 through the speed reduction mechanism 3 and the linear motion mechanism converts the rotary motion transmitted to a linear motion, thus pressing a brake pad (friction member) 4 against a brake disk 5.

This disk brake includes a locking mechanism 6 having a locking pin (pushrod) which provides the disk brake with the function of a parking brake too.

The locking mechanism 6 is configured to lock the linear motion mechanism 2 in position by bringing the locking pin into engagement with a planetary carrier 9 of a planetary gear mechanism forming the linear motion mechanism 2.

The locking mechanism 6 includes a solenoid 7 of which a plunger 8 and a spring are mounted in a bobbin. To lock the linear motion mechanism in position, the plunger 8, which serves as the locking pin, is pushed the spring until engaged in a recess H formed in the planetary carrier 9. To unlock the plunger 8, the plunger 8 is pulled by the solenoid 7 against the force of the spring until the plunger 8 is removed from the recess H.

In another conventional arrangement, as shown in FIG. 9, a plunger 8 having a conical head is configured to be engaged in a conical hole formed in a threaded roller device of a speed reduction mechanism. In still another conventional arrangement, as shown in FIG. 10, a plunger 8 in the form of an engaging claw is configured to be brought into engagement with a protrusion formed on the planetary carrier 9 of the linear motion mechanism.

PRIOR ART DOCUMENT(S)

Patent Document(S)

Patent document 1: JP Patent Publication 2001-524647A

In any of the above arrangements, in which the plunger makes sliding movement, after the parking brake has been continuously used, the plunger tends to suffer from various problems including deterioration in sliding properties and improper engagement, due to mechanical wear. This makes it impossible to reliably apply brakes during parking.

SUMMARY OF THE INVENTION

Object of the Invention

An object of the present invention is to provide a parking brake having the function of monitoring malfunction of the brake, thereby preventing accidents.

Means for Achieving the Object

In order to achieve this object, the present invention provides an electric parking brake, wherein an electric motor is connected to a speed reduction mechanism through a linear motion mechanism, wherein a friction member mounted to the linear motion mechanism is configured to be pressed against a brake disk by rotating the motor, thereby generating a braking force, and wherein with the braking force generated, an engaging member is configured to be moved to an engaged position where the engaging member is brought into engagement with one of the linear motion mechanism and the speed reduction mechanism by means of a solenoid, wherein the parking brake further comprises a monitoring means configured to detect the displacement of a plunger of the solenoid, and monitor the behavior of the engaging member based on the detected displacement.

In this arrangement, the position of the plunger in the solenoid is detected by detecting the displacement of the plunger (or the differentiated value of the displacement). Thus, it is possible to monitor whether the engaging member has moved based on the change in the detected position. At this time, by detecting or calculating the differentiated value of the displacement, the speed of the plunger is known, which in turn makes it possible to determine whether the engaging member is currently moving based on the speed as detected. By detecting the displacement and the differentiated value of the displacement, it is possible to monitor the moving engaging member based on the position and the speed.

Such displacement may be detected by detecting the inductance of the solenoid.

With this arrangement, the following relation is met if the solenoid is connected to an alternating current (AC) power source e:

$$e=(r+j\omega L)i$$

If the AC power source is a constant current source of which the resistance r satisfies the relation $r \gg |j\omega L|$, the following relation is met:

$$e=\omega L i$$

where i is the constant current of the AC source.

Thus, the following relation is met:

$$L=e/\omega i=e/2\pi f i$$

It is thus possible to detect the inductance L of the solenoid from the constant current i and the voltage e as detected by the voltage measuring means.

The inductance L of the solenoid is proportional to the number of magnetic fluxes that cross the solenoid.

Also, the number of fluxes that cross the solenoid should change with the displacement of the plunger, which is a magnetic member that moves in the solenoid 13.

Thus, it is possible to detect the displacement of the plunger by measuring the inductance L.

The plunger may be provided with a magnet.

With this arrangement, since the magnet has its magnetic poles arranged so as to increase the magnetic fluxes of the solenoid, the magnet increases the fluxes crossing the plunger, thus increasing the inductance or the induced current, which in turn improves the sensitivity of detection.

The monitoring means may be configured such that determination is made on whether or not the engaging element has been moved to the engaged position based on the displacement of the plunger.

With this arrangement, the position and/or the speed (which is the differentiated value of the displacement) can be calculated from the displacement, and the moving distance can be calculated from the position or is given by the speed (differentiated value) multiplied by the time interval. It is thus possible to determine whether or not the plunger has reached the engaged position and thus to determine whether or not the parking brake is operating normally, based on the moving distance.

In this arrangement, the parking brake may be configured such that when it is determined that the engaging element has been moved to the engaged position, a driving current supplied to the solenoid is reduced to zero or below a predetermined value, the displacement is measured, and it is determined whether the engaging member has been moved to the engaged position based on the detected displacement.

In this arrangement, in order to monitor whether or not the plunger has engaged, the solenoid is de-activated (for an extremely short time period during which the plunger cannot be returned by the spring) at the engaged position, and the displacement is detected. If the displacement detected does not change (output is zero if the differentiated value is used), it is determined that the engagement has completed. If the position changes (output is not zero if the differentiated value is used), it is determined that the engagement is incomplete.

In this arrangement, the parking brake may be configured such that the displacement is detected to control the rotational angle of the electric motor, when the engaging member is disengaged from the one of the speed reduction mechanism and the linear motion mechanism.

With this arrangement, it is determined whether or not the plunger has disengaged by monitoring the change in displacement (position or speed). For example, if the displacement of the plunger changes by controlling the rotational angle of the motor or by slightly moving the speed reduction mechanism or the linear motion mechanism, this means that the plunger has disengaged. If not, this means that the plunger has not disengaged. In this case, it is possible to disengage the plunger by monitoring until the displacement (namely, the differentiated value) changes.

In this arrangement, the moving speed of the plunger may be calculated from the displacement as detected, and a voltage to be applied to the solenoid may be controlled based on the thus calculated moving speed of the plunger.

With this arrangement, by calculating and monitoring the moving speed of the plunger based on the displacement or the differentiated value of the displacement, it is possible to perform feedback control of the solenoid such that the moving speed of the plunger may not decrease, thereby compensating for deteriorated sliding properties.

In this arrangement, the sliding properties of the plunger may be detected based on the displacement as detected, and the control time necessary for operation may be set based on the sliding properties as detected.

With this arrangement, the sliding properties of the plunger are monitored based on the displacement of the plunger or the differentiated value of the displacement, and the time for determining whether the plunger has engaged is adjusted based on the sliding properties. For example, when controlling the driving current for the solenoid or the rotational angle of the electric motor, the time period during the solenoid is energized or the time for determining improper engagement is extended to address deterioration in the sliding properties. Since it is possible to improve sliding properties by adjusting one of the above-mentioned times, before increasing the rpm of the motor or the rotational angle, it is not necessary to increase the driving current or the rpm or the rotational angle of the motor, which leads to reduced power consumption.

In this arrangement, the displacement as detected may be compared with a predetermined value, and an alarm signal indicative of malfunction may be generated if the displacement as detected becomes inferior to the predetermined value.

With this arrangement, an abnormal state can be notified.

In this arrangement, the parking brake may be configured such that the displacement is detected by applying a minute current which is incapable of bringing the engaging element into engagement with the one of the speed reduction mechanism and the linear motion mechanism to the solenoid, while the solenoid is deactivated, and sliding properties of the plunger are periodically monitored based on the displacement as detected.

With this arrangement, since the plunger is monitored while the plunger is deactivated, it is possible to prevent malfunction.

In this arrangement, the displacement may be detected by detecting the induced current of the solenoid, instead of detecting the inductance of the solenoid.

With this arrangement, when the solenoid is energized, the plunger is displaced, pulled by the solenoid. While the plunger, which is made of a magnetic material, is being displaced, the magnetic fluxes of the solenoid should change corresponding to the displacement of the plunger. At this time, induced current is generated so as to interfere with the change in magnetic fluxes. Since the induced current is opposite in polarity to the voltage applied, it is possible to monitor the displacement of the plunger without the need for a sensor.

Advantages of the Invention

According to the present invention, it is possible to prevent accidents by monitoring the state of the electric parking brake to prevent its malfunction.

BEST MODE FOR EMBODYING THE INVENTION

Now the embodiment of the invention is described with reference to the drawings.

Figure 1:
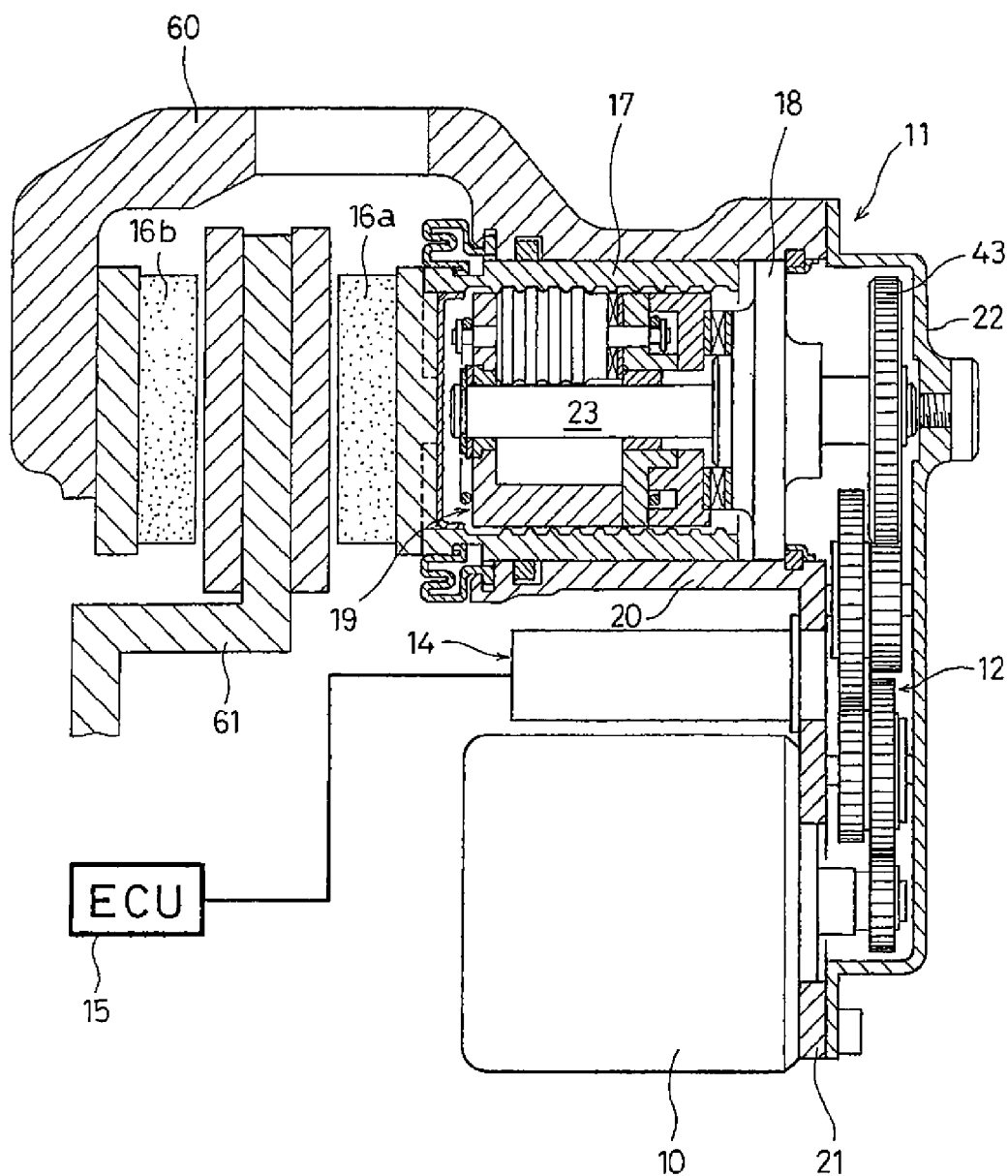
FIG. 1 is a sectional view of an embodiment.

Referring to FIG. 1, the parking brake embodying the invention includes an electric disk brake system for a motor vehicle, and a locking mechanism 14 using a solenoid 13. An electronic control unit (ECU) 15 is connected to the locking mechanism 14.

The vehicle disk brake includes an electric motor 10 and a linear motion mechanism 11 connected to the electric motor 10 through a speed reduction mechanism 12, and configured to press brake pad 16a mounted on the linear motion mechanism 11 against a brake disk 61.

The electric motor 10 is a direct current motor, whereby the rotation of the motor 10 is reversible simply by reversing the polarity of the power source.

The linear motion mechanism 11 comprises an outer ring member 17, a bearing member 18, and a carrier 19, and is mounted in a cylindrical housing 20. A radially outwardly extending base plate 21 is provided at a first end of the cylindrical housing 20. A cover 22 is provided to cover the outer side surface of the base plate 21 and an opening of the housing 20 at the first end thereof. The motor 10 is mounted on the base plate 21 such that the rotation of the motor 10 is transmitted to a rotary shaft 23 through the speed reduction mechanism 12, which is mounted in the cover 22.

Figure 2:
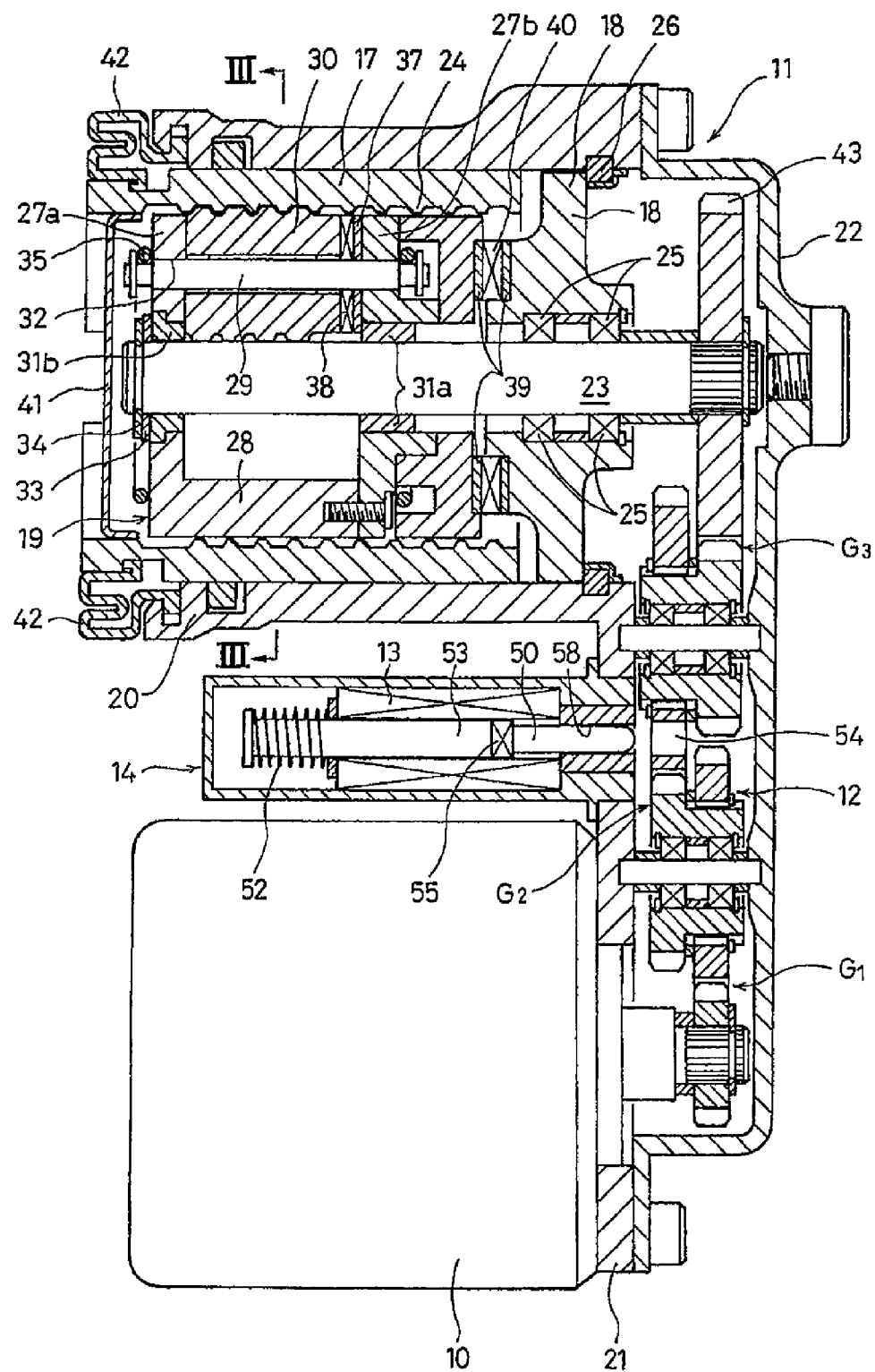
FIG. 2 is a sectional view of a linear motion mechanism of FIG. 1.

The outer ring member 17 is a slide member rotationally fixed in position and slidable in the axial direction along the radially inner surface of the housing 20. As shown in FIG. 2, a helical rib 24 having a V-shaped section is formed on the radially inner surface of the outer ring member 17.

The bearing member 18 is a disk member having a boss at the central portion thereof, and is mounted to face a first axial end of the outer ring member 17. Two mutually spaced apart rolling bearings 25 are mounted in the central boss of the bearing member 18. The rolling bearings 25 rotatably support the rotary shaft 23, which extend along the axis of the outer ring member 17. The bearing member 18 is prevented from moving toward the cover 22, which covers the open end of the housing 20 by a stopper ring 26 mounted on the inner periphery of the housing 20.

Figure 3:
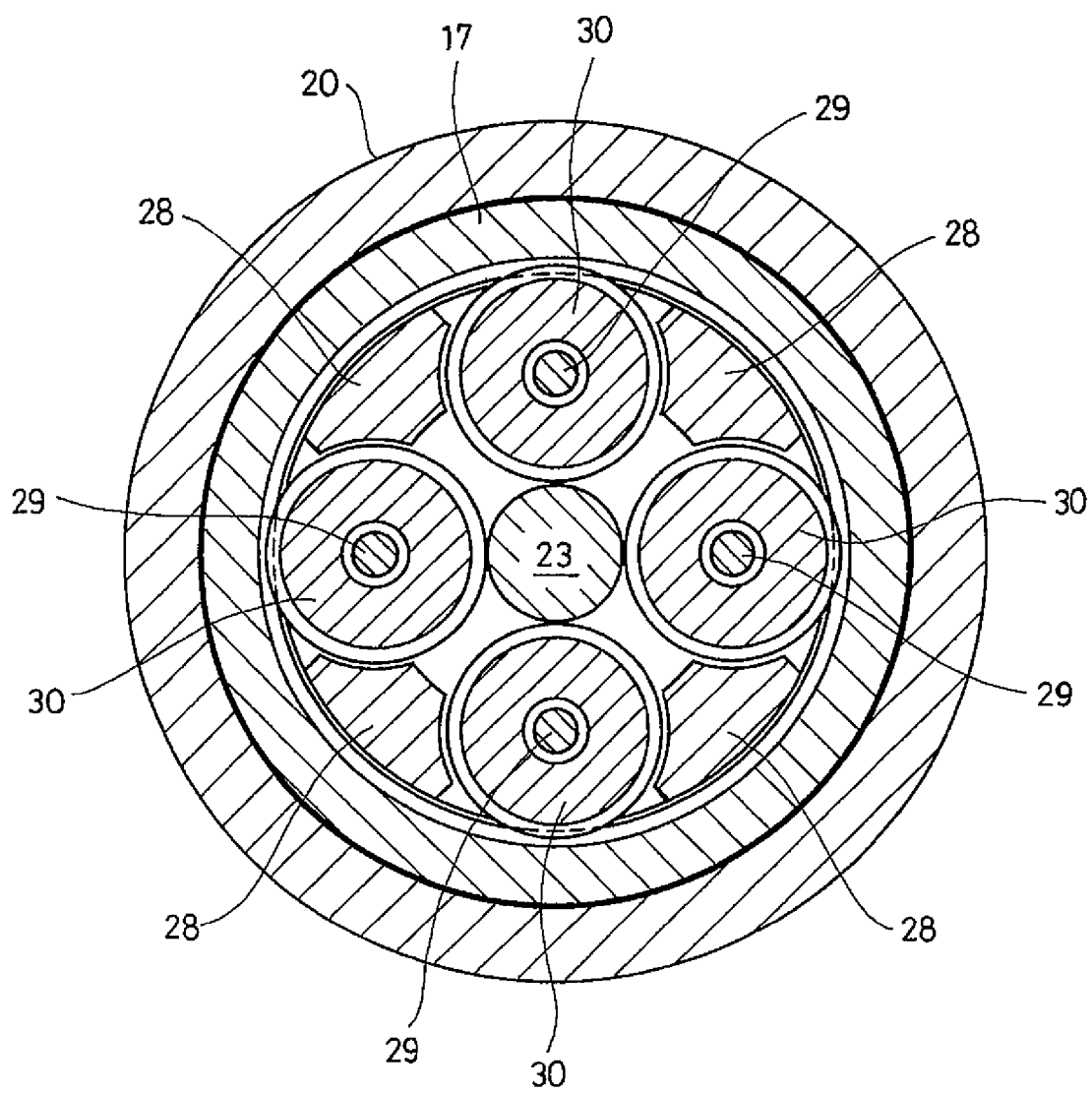
FIG. 3 is a sectional view taken along line III-III of FIG. 2.

Referring to FIGS. 2 and 3, the carrier 19 comprises an axially opposed pair of disks 27a and 27b, a plurality of space adjusting members 28, and a plurality of roller shafts 29. The roller shafts 29 rotatably support the respective planetary rollers 30, and are mounted inside the outer ring member 17 so as to revolve around the rotary shaft 23.

In particular, the space adjusting members 28 extend from the outer peripheral portion of one side surface of the disk 27a toward the disk 27b so as to be circumferentially spaced apart from each other. The disks 27a and 27b are coupled together by tightening screws threaded into the distal end surfaces of the space adjusting members 28.

The disk 27b, which is located on the inboard side of the carrier and thus located closer to the bearing member 18 than is the other disk 27a, is rotatably and axially movably supported by a slide bearing 31a.

The outboard disk 27a is formed with a shaft inserting stepped hole at its central portion. A slide bearing 31b is fitted in the shaft inserting hole and is rotatably supported by the rotary shaft 23. A metal washer 33 is fitted on the rotary shaft 23 adjacent to the outboard end surface of the slide bearing 31b and is configured to receive thrust loads. The washer 33 is prevented from separation from rotary shaft 23 by a snap ring 34 mounted on the end of the rotary shaft 23.

Each of the roller shafts 29 has its respective ends inserted in shaft inserting elongated holes 32 formed in the respective disks 27a and 27b and is thus radially movable. Elastic rings 35 are wrapped around the roller shafts 29 and radially inwardly bias the roller shafts 29. The planetary rollers 30 are rotatably supported on the respective roller shafts 29.

Referring to FIG. 3, the planetary rollers 30 are mounted between the radially outer surface of the rotary shaft 23 and the radially inner surface of the outer ring member 17. The elastic rings 35 bias the roller shafts 29, which are mounted inside the radially inner surface of the outer ring member 17, thereby elastically pressing the planetary rollers 30 against the radially outer surface of the rotary shaft 23 such that when the rotary shaft 23 rotates, the planetary rollers 30 rotate due to frictional contact of the planetary rollers 30 with the radially outer surface of the rotary shaft 23.

As shown in FIG. 2, a plurality of axially equidistantly spaced apart helical grooves having a V-shaped section are formed in the radially outer surface of each planetary roller 30. The helical grooves are equal in pitch to the pitch of the helical rib 24 formed on the outer ring member 17, and are in threaded engagement with the helical rib 24. Instead of the helical grooves, each planetary roller 30 may be formed with a plurality of circumferential grooves which are axially equidistantly spaced apart from each other with a pitch equal to the pitch of the helical rib 24.

Referring to FIG. 2, a washer 37 and a thrust bearing 38 are mounted between the axially opposed portions of each planetary roller 30 and the inboard disk 27b of the carrier 19. An annular thrust plate 39 is mounted between the axially opposed portions of the carrier 19 and the bearing member 18, and a thrust bearing 40 is mounted between the thrust plate 39 and the bearing member 18.

A seal cover 41 is mounted to the outer ring member 17 to close the opening of the outer ring member 17 at the second end thereof, which is located outwardly of the opening of the housing 20 at the second end thereof, thereby preventing entry of foreign matter into the outer ring member 17. A bellows 42 has one end thereof coupled to the opening of the housing 20 at the first end, and the other end of the bellows 42 coupled to the second end of the outer ring member 17. The bellows 42 thus prevents entry of foreign matter into the housing 20.

The speed reduction mechanism 12 includes a primary reduction gear train G1, a secondary reduction gear train G2, and a tertiary reduction gear train G3 that are arranged such that rotation of an input gear mounted on the rotor shaft of the motor 10 is reduced in speed in a stepwise manner by the respective gear trains G1 to G3, and is transmitted to an output gear 43, thereby rotating the rotary shaft 23.

The speed reduction mechanism 12 further includes the locking mechanism 14, which is capable of selectively locking and unlocking the rotor shaft of the motor 10.

Figure 4:
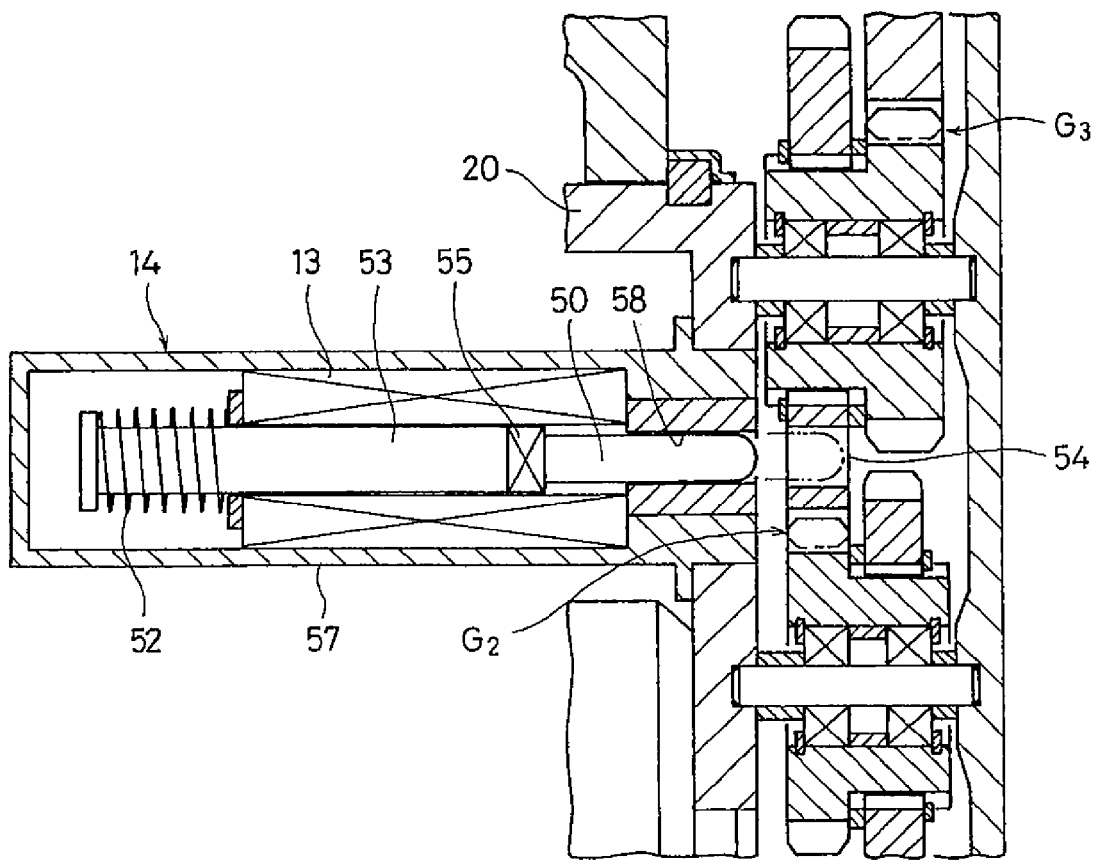
FIG. 4 is a sectional view of a locking mechanism of FIG. 1.

The locking mechanism 14 includes an engaging pin (locking pin) 50 as an engaging member, and a pin driving solenoid 13. Referring to FIG. 4, the pin driving solenoid 13 comprises a linear (direct current) solenoid including a return spring 52 and constituting a push type actuator. The locking pin 50 is mounted to a plunger 53 of the solenoid 13 through a magnet 55. (The locking pin 50 may however be integral with the plunger 53 instead.)

With this arrangement, when the solenoid 13 is energized, the plunger 53 is pulled by the solenoid coil such that the locking pin 50, which is provided at the distal end of the plunger 53, protrudes from a bobbin against the force of the spring 52. The magnet 55 is mounted on the plunger 53 corresponding to the direction of the magnetic fluxes generated by the solenoid 13 so as to increase the magnetic fluxes. Thus, the magnet 55 increases the magnetic fluxes crossing the plunger 53, thereby increasing the value of inductance L.

When the solenoid 13 is de-energized, the plunger 53 is pulled by the spring 52, so that the locking pin 50 at the distal end of the plunger 53 is retracted into the bobbin.

The solenoid 13 is mounted in a protective cover 57 having a front plate in which is formed a pin hole 58 through which the locking pin 50 is slidably inserted. As shown in FIG. 2, the solenoid 13 is supported by the base plate 21 between the housing 20 and the motor 10.

By providing the solenoid 13 between the housing 20 and the motor 10, the locking pin 50 at the distal end of the plunger 53 can be protruded into and retracted from an intermediate output gear 54 of the secondary reduction gear train G2.

Figure 5:
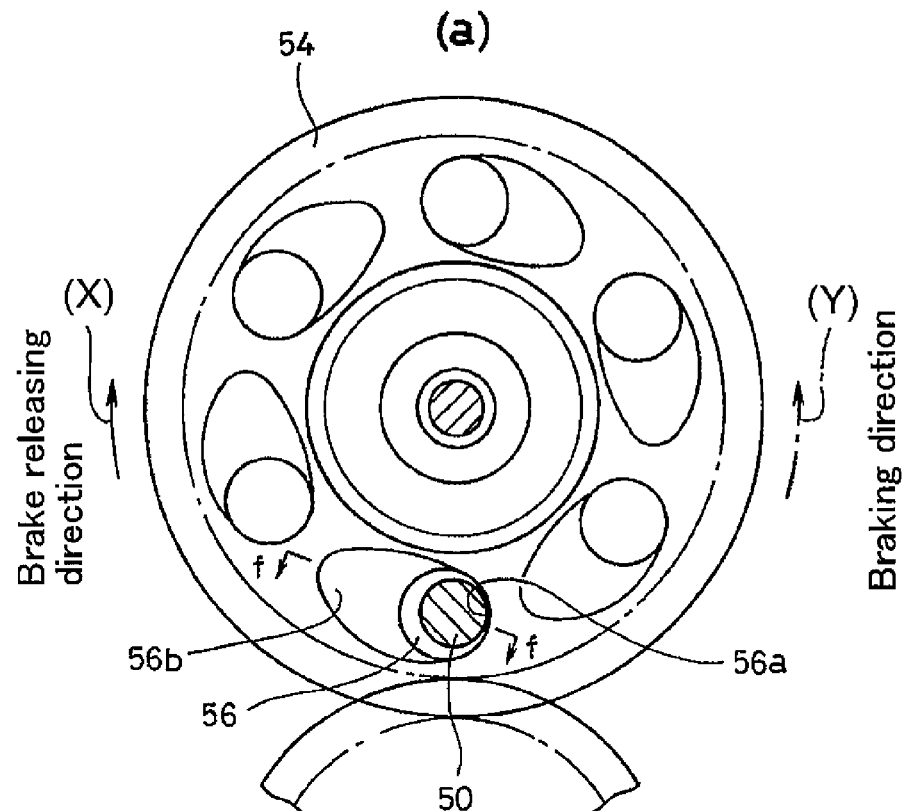
FIGS. 5(a) and 5(b) illustrate how an intermediate gear of FIG. 1 operates.
Figure 5:
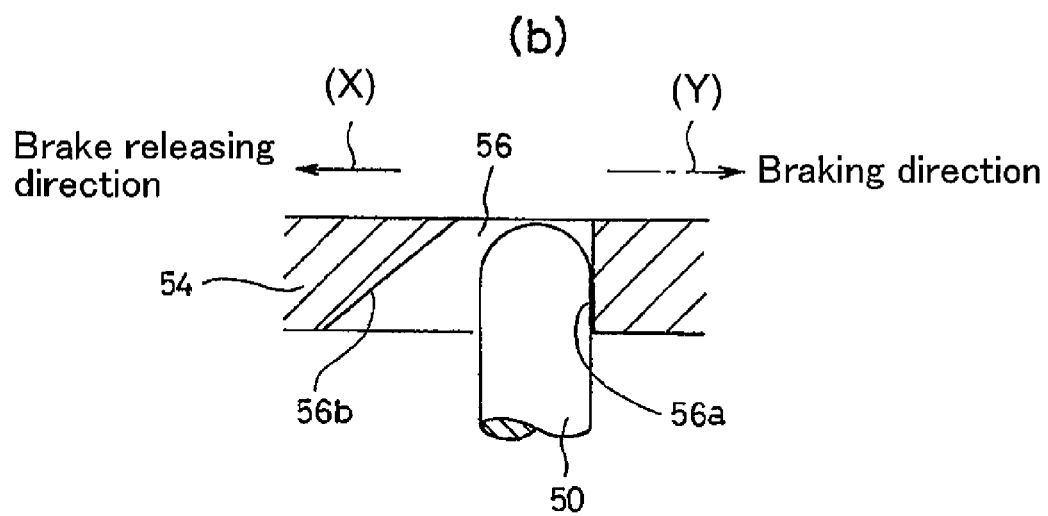

As shown in FIG. 5(a), the intermediate gear 54 is formed with a plurality of engaging holes 56 in its side surface that lie on a single circumference and equidistantly spaced apart from each other such that the locking pin 50 can be pushed into and retracted from any one of the engaging holes 56 by the solenoid 13. When the locking pin 50 is engaged in one of the engaging holes 56 as shown in FIG. 5(b), the intermediate gear 54 is locked in position.

The engaging holes 56 each have a locking surface 56a and a tapered surface 56b such that the holes 56 act as a ratchet.

In particular, the locking surface 56a is provided at a first circumferential end of each engaging hole 56, and prevents rotation of the intermediate gear 54 in the direction of the arrow X, namely the direction in which the brake is released, when the locking pin 50 engages the locking surface 56a. The tapered surface 56b allows the locking pin 50 to be pushed out of the engaging hole 56 when the intermediate gear 54 in the direction of the arrow Y, namely the braking direction.

With this arrangement, the intermediate gear 54 can be smoothly rotated in the braking direction even with the locking pin 50 engaged in one of the locking holes 56. Also, once the locking pin 50 is engaged in one of the locking holes 56, it is possible to reliably maintain a predetermined pressing force on the brake disk 61 that is necessary to keep the vehicle in park.

As shown in FIG. 1, a caliper body 60 is integrally connected to the second end of the housing 20. The caliper body 60 includes a fixed brake pad 16b and a movable brake pad 16a which are provided on the respective sides of the outer peripheral portion of the brake disk 61 that is located in the caliper body 60. The movable brake pad 16a is fixedly coupled to the second end of the outer ring member 17.

The ECU 15 is a microcontroller for brake control including a central processing unit (CPU). As shown in the schematic view of FIG. 6, the ECU 15 includes a direct current (DC) power source 70 for driving the solenoid 13.

The ECU 15 further includes a displacement detecting means 71 and a switch means 72. The displacement detecting means 71 and the solenoid driving DC power source 70 are connected to the pin driving solenoid 13 through the switch means 72.

In the embodiment, the switch means 72 comprises a semiconductor switch such as a transistor switch, which can be switched on and off at a high speed.

The displacement detecting means 71 includes an alternating current (AC) power source means 73 and a voltage measuring means 74.

The voltage measuring means 74 is disposed between the AC power source means 73 and the switch means 72, and connected parallel to the AC power source means 73.

The AC power source means 73 is a constant current source of which the resistance r satisfies the relation:

$$r \gg |j\omega L|$$

where L is the inductance of the solenoid.

Thus, when the switch means 72 is connected to the contact "b", the solenoid 13 is connected to the AC power source means 73, so that the following relation is met:

$$e = (r + j\omega L)i$$

Thus, since $r \gg |j\omega L|$. the following relation is met:

$$e = \omega L i$$

where i is the constant current of the AC source.

Therefore, the following relation is met:

$$L = v/\omega i = v/2\pi f i$$

It is thus possible to detect the inductance L of the solenoid 13 from the current i (which is the known constant current) and the voltage e as detected by the voltage measuring means 74.

The inductance L of the solenoid 13 is proportional to the number of magnetic fluxes that cross the solenoid 13. Also, the number of fluxes that cross the solenoid 13 should change with the displacement of the plunger 53, which is a magnetic member that moves in the solenoid 13.

Thus, it is possible to detect the displacement of the plunger 53 by measuring the inductance L.

In this embodiment, the ECU 15 uses the solenoid 13 itself as a sensor, and does not use any additional sensor element, in monitoring, determining, compensating for, and notifying in advance of, any malfunction of the locking mechanism (parking brake) based on a control program.

Since the solenoid 13 itself is used as a sensor and no additional sensor element is used, it is possible to minimize the risk of accidents due to malfunction of a sensor.

The ECU 15 is first described regarding its function of monitoring malfunction and determining malfunction based on monitoring.

Figure 6:
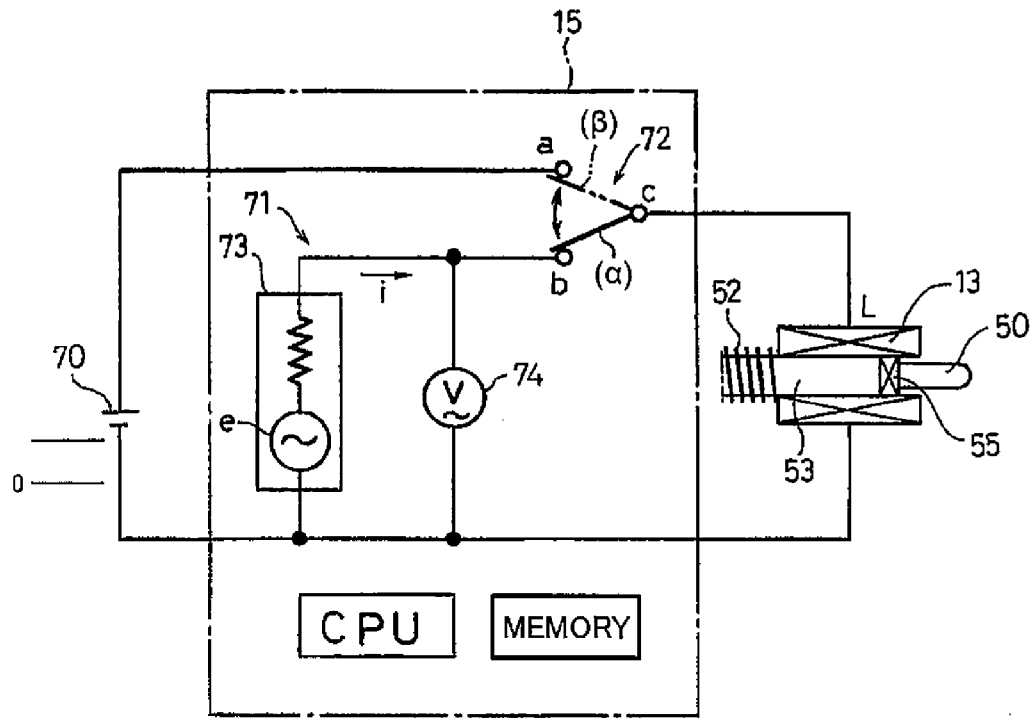
FIG. 6 schematically illustrates a control circuit for the locking mechanism according to the embodiment.

In this electric parking brake, while the locking mechanism 14 is disengaged, such as while the vehicle is traveling, the ECU 15 keeps the switch means 72 connected the contact "b" as shown by the letter "α" in FIG. 6, thereby connecting the solenoid 13 to the displacement detecting means 71. Since the solenoid 13 is turned off in this state (because the solenoid 13 is a DC solenoid and thus is not energized by the alternating current supplied from the displacement detecting means 71), the plunger 53 is pulled by the spring 52 to a position where the locking pin 50 at the distal end of the plunger 53 is kept out of engagement with the intermediate gear 54 of the secondary reduction gear train G2 in the speed reduction mechanism 12.

In this state, the displacement detecting means 71 is detecting the inductance L corresponding to the disengaged position of the plunger 53, which is used as a reference position. The detected value is stored in the ECU 15.

When the locking mechanism (parking brake) is actuated with the brake applied in order to park the vehicle, the ECU 15 moves and connects the switch means 72 to the contact "a" as shown by the letter "β" in FIG. 6. In this state, the solenoid 13 is connected to and thus activated by the solenoid driving DC power source 70. The solenoid 13 thus pulls the plunger 53 to cause the locking pin 50 at the distal end of the plunger 53 to protrude from the pin hole 58 of the protective cover 57 and engage in one of the engaging holes 56 of the intermediate gear 54 of the secondary reduction gear train G2 in the speed reduction mechanism 12.

During the period from when the locking pin 50 protrudes from the pin hole 58 until the locking pin 50 engages the intermediate gear 54, the ECU 15 moves and connects the switch means 72 to the contact "b" for an extremely short period of time. As used herein, "extremely short period of time" refers to a short time period during which the spring 52 cannot stop the movement of the plunger 53.

This sampling period is the period of time during which the plunger 53 engages the intermediate gear 54.

The magnet 55 provided on the plunger 53 increases magnetic fluxes, thereby improving sensitivity of detection and thus detection accuracy while the plunger 53 is moving.

The inductance as measured in the above manner is compared with the reference value stored in the memory. If the former differs from the latter, this indicates that the plunger 53 has moved. Thus, by monitoring the displacement of the plunger 53, it is possible to determine whether the solenoid 13 is operating normally.

By differentiating the displacement values (or from the difference between displacement values), it is possible to calculate the moving speed of the plunger 53 and thus to determine that the plunger is moving. Further, since the position and the moving speed of the plunger 53 are known from the displacement values and the differentiated values of the displacement values, it is possible to monitor the plunger 53 while the plunger is moving.

By setting the inductance L when the locking pin 50 is engaged in one of the engaging holes 56 of the intermediate gear 54, it is possible to monitor whether or not the locking pin 50 is engaged in one of the engaging holes 56.

In particular, if there is a difference between the set value and the detected value, this means that the plunger 53 is not in the predetermined engaged position. Also, from this difference, it is possible to calculate the displacement of the plunger 53 from the predetermined engaged position. If this displacement is within a permissible range, the ECU determines that the locking pin 50 is in one of the engaging holes 56, and if not, the ECU determines that the locking pin 50 is not engaged in one of the engaging holes 56.

If it is determined that the locking pin 50 is engaged in one of the engaging holes 56, the solenoid 13 is once again de-energized to measure the inductance L, and the ECU monitors whether or not the intermediate gear 54 has been locked in position.

In particular, when the inductance L measured at this time is different from the set value, this means that the plunger 53 has moved from the predetermined engaged position. Thus, the ECU can detect whether or not the plunger 53 has moved from the predetermined engaged position.

In the above manner, the ECU monitors malfunction of the solenoid 13, namely deteriorated sliding movement while the solenoid 13 is activated and improper engagement of the locking pin 50, by detecting the displacement of the plunger 53.

Compensation function of the present invention is now described.

The compensation function is provided to cope with deteriorated sliding movement while the solenoid 13 is activated, and improper engagement when the intermediate gear is unlocked.

To compensate for deteriorated sliding movement, the sliding speed is calculated from the displacements as detected during the above-described monitoring of deteriorated sliding movement. If the thus calculated sliding speed is decreasing, feedback control of the driving current is performed to compensate for the decreasing sliding speed.

In order to detect that the sliding speed is decreasing, the calculated sliding speeds are preferably stored in the memory in a chronological order.

The sliding speed can be easily calculated by dividing the displacements by the sampling intervals when repeatedly detecting the difference between the current displacement and the previous displacement. At this time, by monitoring the differentiated value of the displacement (speed), it is possible to know the current engaging state simply by detecting the change in differentiated value, which makes it possible to quicken the response of control.

To compensate for improper engagement, the electric motor 10 for linear motion is used.

In particular, to disengage the locking mechanism (parking brake) 14, the ECU 15 moves and connects the switch means 72 to the contact "b" to connect the solenoid 13 to the displacement detecting means 71. The solenoid 13 is thus de-energized, so that the plunger 53 of the solenoid 13 is pulled by the spring 52. The locking pin 50 at the distal end of the plunger 53 should therefore be disengaged from the intermediate gear 54 of the speed reduction mechanism 12.

However, since the engaging holes 56 of the intermediate gear 54 have the locking surfaces 56a and the tapered surfaces 56b and thus function as a ratchet, the distal end of the locking pin 50 could get caught on the locking surface 56a, which is opposed to the tapered surface 56b.

The ECU 15 constantly detects the inductance L in order to smoothly disengage the locking pin 50 from the intermediate gear 54.

In particular, the ECU 15 monitors whether or not the locking pin 50 has disengaged from the intermediate gear 54 by constantly detecting the displacement and detecting the change in the thus detected displacement (position). If the displacement does not change and thus the locking pin does not disengage, in e.g. the embodiment of FIG. 5(a), the intermediate gear 54 is further rotated in the braking direction, namely the direction of the arrow Y, by the motor 10, thereby disengaging the locking pin 50 from the intermediate gear 54 using the tapered surface 56b.

At this time, by detecting the differentiated value of the displacement (speed) (using a differentiating element such as a capacitor), it is possible to more quickly disengage the locking pin.

By compensating for improper disengagement in this manner, it is possible to disengage the locking pin and return the plunger 53 of the solenoid to the off position shown in FIG. 2.

While in the embodiment, each engaging hole 56 has the tapered surface 56b, if the engaging holes 56 have no such tapered surfaces 56b, it is possible to disengage the locking pin from the intermediate gear 54 by slightly rotating the motor 10 back and force, namely slightly increasing and reducing the rotational angle of the motor 10.

Since it is possible to determine the sliding properties of the solenoid 13 from the displacement of the plunger 53 or the differentiated value of the displacement, it is possible to adjust the time during which the solenoid is energized, or the time at which determination is made on whether or not the locking pin has disengaged, before controlling the driving current to be applied to the solenoid or the rotational angle of the intermediate gear 54.

With this arrangement, since it is possible to cope with deteriorated sliding movement without the need to increase the driving current or increase the rpm of the motor 10, it is possible to reduce the power consumption.

If it is impossible to disengage the locking pin by adjusting the time during which the solenoid is energized, or the time at which determination is made on whether or not the locking pin has disengaged, the driving current or rotational angle is increased, in addition to the above adjustment.

The parking brake according to the present invention is further configured such that if sliding abnormality reaches its limit, a warning is issued.

In particular, the parking brake may be configured such that if the above-described displacement or the differentiated value of the displacement does not improve (for example, if the above value is inferior to a predetermined upper limit), determination is made that the parking brake is malfunctioning, and an alarm signal is generated.

The electric parking brake according to the present invention is further provided with a function of predicting a failure of the locking mechanism 14.

This failure prediction function tests the sliding properties of the locking mechanism 14 by energizing the solenoid 13 of the locking mechanism 14.

In particular, the ECU 15 energizes the solenoid 13 by moving the switch means 72 from the position connected to the contact "b" to the position connected to the contact "a", thereby activating the plunger 53, while the locking mechanism is not activated (such as while the vehicle is at a stop at a traffic signal).

Then, the ECU 15 detects the inductance L by repeatedly moving and connecting the switch means 72 to the contact "b". The time during which the switch means 72 is connected to the contact "b" is such a short time during which the spring 52 cannot stop the movement of the plunger 53. The ECU 15 then moves and connects the switch means 72 to the contact "b" to de-energize the solenoid 13, before the plunger 53 is engaged in one of the engaging holes 56 of the intermediate gear 54. As a result, the plunger 53 is pulled back by the spring 52 to the off position without getting engaged in one of the engaging holes 56 of the intermediate gear 54.

Needless to say, the time at which the solenoid 13 is de-energized is set beforehand at a sufficiently safe time.

By detecting the inductance L in the above manner, it is possible to calculate the displacement of the plunger 53. By periodically detecting the inductance L, it is possible to detect a tendency of the displacement to decrease based on the detected data on displacement, or to detect the degree of reduction in the displacement from the differentiated value of displacement (speed of the plunger 53), thereby predicting a possible failure and preventing a future accident.

EXAMPLE 1

Figure 7:
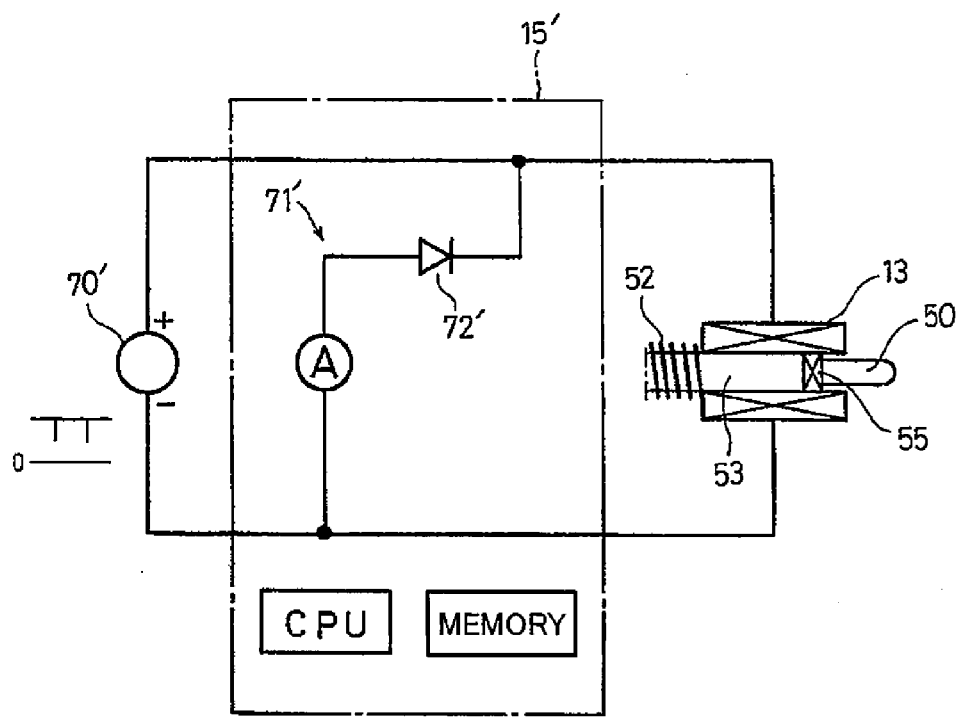
FIG. 7 schematically illustrates a control circuit for the locking mechanism according to Example 1.
Figure 8:
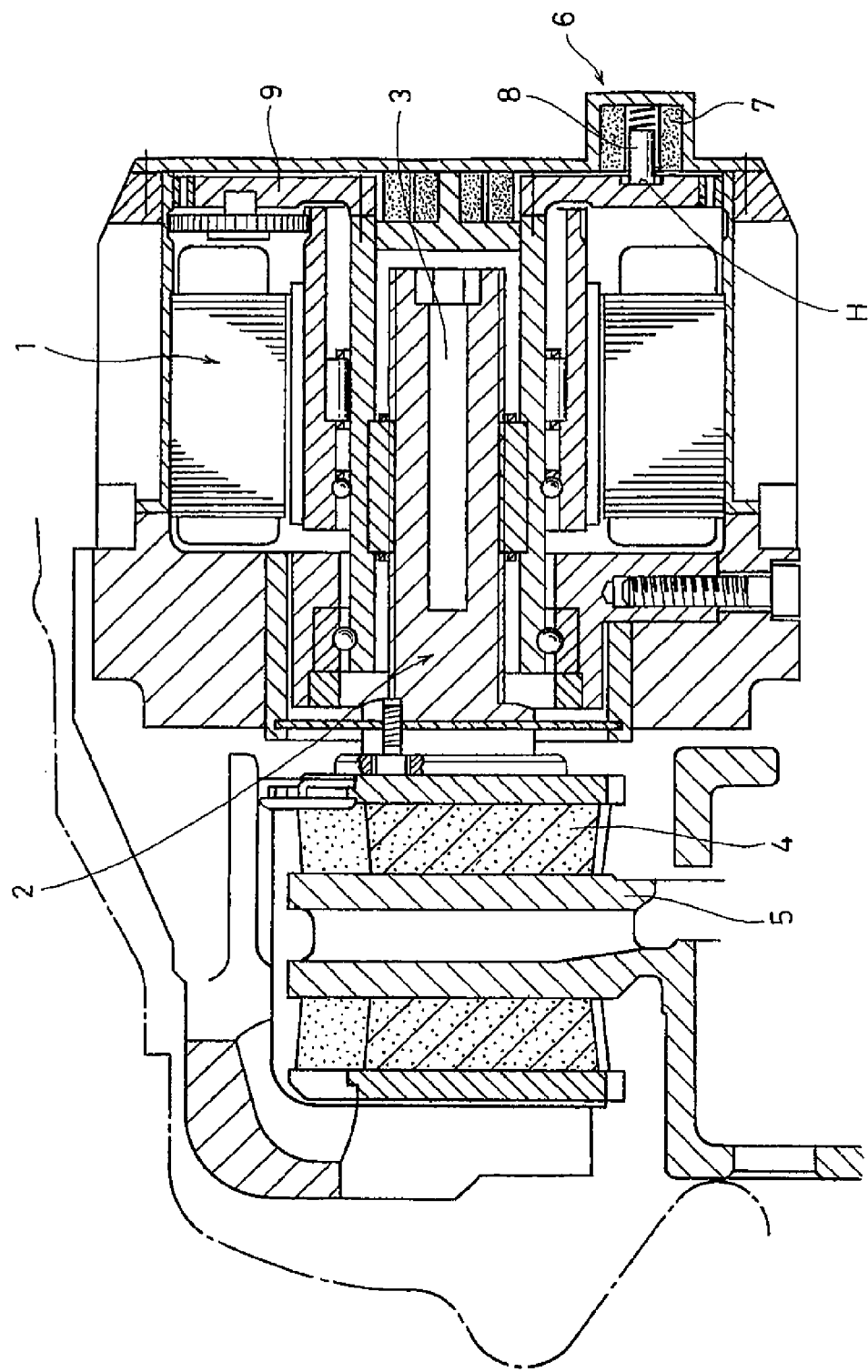
FIG. 8 is a sectional view of a conventional arrangement.

In Example 1, the displacement of the plunger 53 is monitored by detecting the induced current instead of the inductance L. FIG. 7 schematically shows an ECU 15' used to detect the induced current.

The ECU 15' is a microcontroller similar to that shown in FIG. 7 in that it includes a CPU and configured to control a disk brake. The ECU 15' includes a solenoid driving DC power source 70' configured to generate intermittent outputs for a short period of time.

The ECU 15' further includes a displacement detecting means 71' and a switch means 72'.

The displacement detecting means 71' is configured to detect the induced current.

The switching means 72' is a switching diode of which the anode terminal is connected to the displacement detecting means 71' such that the switch means 72' and the displacement detecting means 71' form a series circuit. This series circuit has its cathode terminal to the positive electrode of the solenoid driving DC power source 70' so that the series circuit and the DC power source 70' are connected to the solenoid 13, parallel to each other.

The ECU 15' detects the induced current, which is generated so as to interfere with the magnetic fluxes of the solenoid 13.

In particular, when the solenoid 13 is energized, the plunger 53 is pulled and moved by the solenoid 13. When the plunger 53, which is made of a magnetic material, moves, the magnetic fluxes of the solenoid 13, which cross the solenoid 13, change according to the displacement of the plunger 53. As a result, an induced current is generated so as to interfere with any change in magnetic fluxes. Since the polarity of the induced current is opposite to that of the voltage applied, the induced voltage can be detected by the current detecting means forming the displacement detecting means 71' through the diode forming the switch means 72'.

Since the solenoid driving DC power source 70' generates intermittent outputs (which are offset by $\pi/2$ in phase), by detecting the induced current while the DC power source 70' is generating no output, it is possible to detect only the induced current.

In Example 1, by detecting the induced current, instead of the inductance L, in the above-described manner, it is possible to monitor the displacement of the plunger 53 and thus to detect malfunction of the locking mechanism.

Thus, the ECU 15' uses the solenoid 13 itself as a sensor, and does not use any additional sensor element, in monitoring, determining, compensating for, and notifying in advance of, any malfunction of the locking mechanism (parking brake) based on a control program. As a result, it is possible to minimize the risk of accidents due to malfunction of a sensor.

The ECU 15' is first described regarding its function of monitoring malfunction and determining malfunction based on monitoring.

In this electric parking brake, while the locking mechanism 14 is disengaged, such as while the vehicle is traveling, the solenoid 13 is turned off. In this state, the plunger 53 is pulled by the spring 52 to a position where the locking pin 50 at the distal end of the plunger 53 is kept out of engagement with the intermediate gear 54 of the secondary reduction gear train G2 in the speed reduction mechanism 12.

When the locking mechanism (parking brake) is actuated with the brake applied in order to park the vehicle, the ECU 15' activates the solenoid 13 by supplying electricity to the solenoid 13 from the solenoid driving DC power source 70'. The solenoid 13 thus pulls the plunger 53 to cause the locking pin 50 at the distal end of the plunger 53 to protrude from the pin hole 58 of the protective cover 57 and engage in one of the engaging holes 56 of the intermediate gear 54 of the secondary reduction gear train G2 in the speed reduction mechanism 12.

In this example, the DC power source 70' is configured to generate intermittent outputs, and the ECU is configured to detect the induced current through the diode forming the switch means 72' while the DC power source 70' is not generating outputs.

The magnet 55 provided on the plunger 53 increases magnetic fluxes, and thus the induced current, thereby improving sensitivity of detection and thus detection accuracy.

If the detected induced current changes, this means that the plunger 53 has moved. Thus, by detecting the displacement of the plunger 53, it is possible to determine whether the solenoid 13 is operating normally.

By differentiating the displacement values, it is possible to determine whether the plunger is moving depending on whether there is an output.

The induced current is continuously monitored until a sufficient time period has passed during which the locking pin 50 is supposed to be engaged in one of the engaging holes 56 of the intermediate gear 54. If the generation of induced current stops by the end of this time period, this means that the locking pin 50 has engaged and thus the displacement of the plunger 53 has stopped. Thus, by monitoring the displacement of the plunger, it is possible to determine whether or not the locking pin 50 has been engaged in one of the engaging holes 56.

On the other hand, if the induced current is detected at the end of the above time period, this means that the locking pin 50 has failed to engage the intermediate gear.

When the locking pin is successfully brought into engagement with the intermediate gear, the current supplied to the solenoid 13 is reduced to zero or to less than the operating current, and the induced current value is detected. If the induced current value is changing at this time, this means that the plunger 53 has moved, thus disengaging the locking pin from the engaging hole 56. Thus, by monitoring the displacement of the plunger 53, it is possible to determine whether the engagement has completed.

Behavioral Compensation function is now described.

The compensation function is provided to cope with deteriorated sliding movement while the solenoid 13 is activated, and improper engagement when the intermediate gear is unlocked.

To compensate for deteriorated sliding movement, in the same manner as in the embodiment, the sliding speed is calculated from the displacements as detected during the above-described monitoring of deteriorated sliding movement. If the thus calculated sliding speed is decreasing, the driving current is controlled to compensate for the decreasing sliding speed.

In order to detect that the sliding speed is decreasing, the calculated sliding speeds are preferably stored in the memory in a chronological order.

The sliding speed can be calculated from the difference between the current displacement and the previous displacement. At this time, by monitoring the differentiated value of the displacement (speed), it is possible to know the current engaging state simply by detecting the change in differentiated value from the change in speed, which makes it possible to quicken the response of control.

To compensate for improper engagement, the electric motor 10 for linear motion is used.

In particular, in order to disengage the locking mechanism (parking brake) 14, the ECU 15' stops supplying electricity to the solenoid 13 from the solenoid driving DC power source 70, thus deactivating the solenoid 13. As a result, the plunger 53 of the solenoid 13 is pulled by the spring 52, so that the locking pin 50 at the distal end of the plunger 53 is disengaged from the intermediate gear 54 of the secondary reduction gear train G2 in the speed reduction mechanism 12.

At this time, the ECU 15' monitors the displacement of the plunger by constantly detecting the induced current, in order to smoothly disengage the locking pin 50 from the intermediate gear 54.

In particular, the ECU 15' monitors whether or not the locking pin 50 has disengaged from the intermediate gear 54 by constantly detecting the displacement and detecting the change in the thus detected displacement (position). If the displacement does not change and thus the locking pin does not disengage, in e.g. the embodiment of FIG. 5(a), the intermediate gear 54 is further rotated in the braking direction, namely the direction of the arrow Y, by the motor 10, thereby disengaging the locking pin 50 from the intermediate gear 54 using the tapered surface 56b.

At this time, by detecting the differentiated value of the displacement (speed), it is possible to more quickly disengage the locking pin, for the reasons set forth above.

By compensating for improper disengagement in this manner, it is possible to disengage the locking pin and return the plunger 53 of the solenoid to the off position shown in FIG. 2.

Since, as described above, it is possible to determine the sliding properties of the solenoid 13 from the displacement of the plunger 53 or the differentiated value of the displacement, it is possible, in the same manner as in the embodiment, to adjust the time during which the solenoid 13 is energized, or the time at which determination is made on whether or not the locking pin has disengaged, before controlling the driving current to be applied to the solenoid 13 or the rotational angle of the intermediate gear 54. With this arrangement, since it is possible to cope with deteriorated sliding movement without the need to increase the driving current or increase the rpm of the motor 10, it is possible to reduce the power consumption.

If it is impossible to disengage the locking pin by adjusting the time during which the solenoid is energized, or the time at which determination is made on whether or not the locking pin has disengaged, the driving current or rotational angle is increased, in addition to the above adjustment.

The parking brake according to the present invention is further configured such that if sliding abnormality reaches its limit, a warning is issued.

In particular, the parking brake may be configured such that if the above-described displacement or the differentiated value of the displacement is inferior to a predetermined value, determination is made that the parking brake is malfunctioning, and an alarm signal is generated.

This electric brake unit is further provided with a function of predicting a failure of the locking mechanism 14. This failure prediction function tests the sliding properties of the locking mechanism 14 by energizing the solenoid 13 of the locking mechanism 14.

In particular, the ECU 15' energizes the solenoid 13, thereby activating the plunger 53, and detect the induced current, while the parking brake is not activated (such as while the vehicle is at a stop at a traffic signal). Then, the ECU 15' de-energizes the solenoid 13 before the plunger 53 is engaged in one of the engaging holes 56 of the intermediate gear 54. Needless to say, the time at which the solenoid 13 is de-energized is set beforehand at a sufficiently safe time.

By detecting the induced current, it is possible to calculate the displacement of the plunger 53. By periodically detecting the induced current, it is possible to detect a tendency of the displacement to decrease based on the detected data on displacement, or to detect the degree of reduction in the displacement from the differentiated value of displacement (speed of the plunger 53), thereby predicting a possible failure and preventing a future accident.

Figure 10:
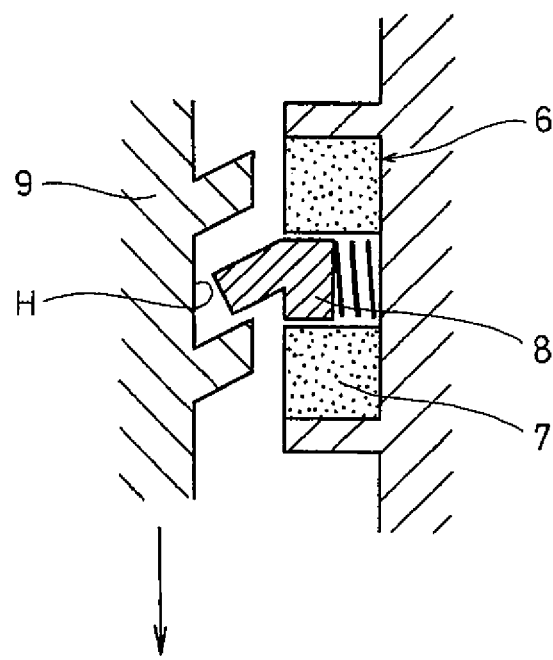
FIG. 10 illustrates an operational state of a still different conventional arrangement.

In the embodiment and in Example 1, the engaging member comprises a locking pin 50, but the engaging member is not limited to a locking pin. Provided the engaging member can be moved by the plunger 53, the engaging member may e.g. comprises an engaging claw 8 shown in FIG. 10.

Figure 9:
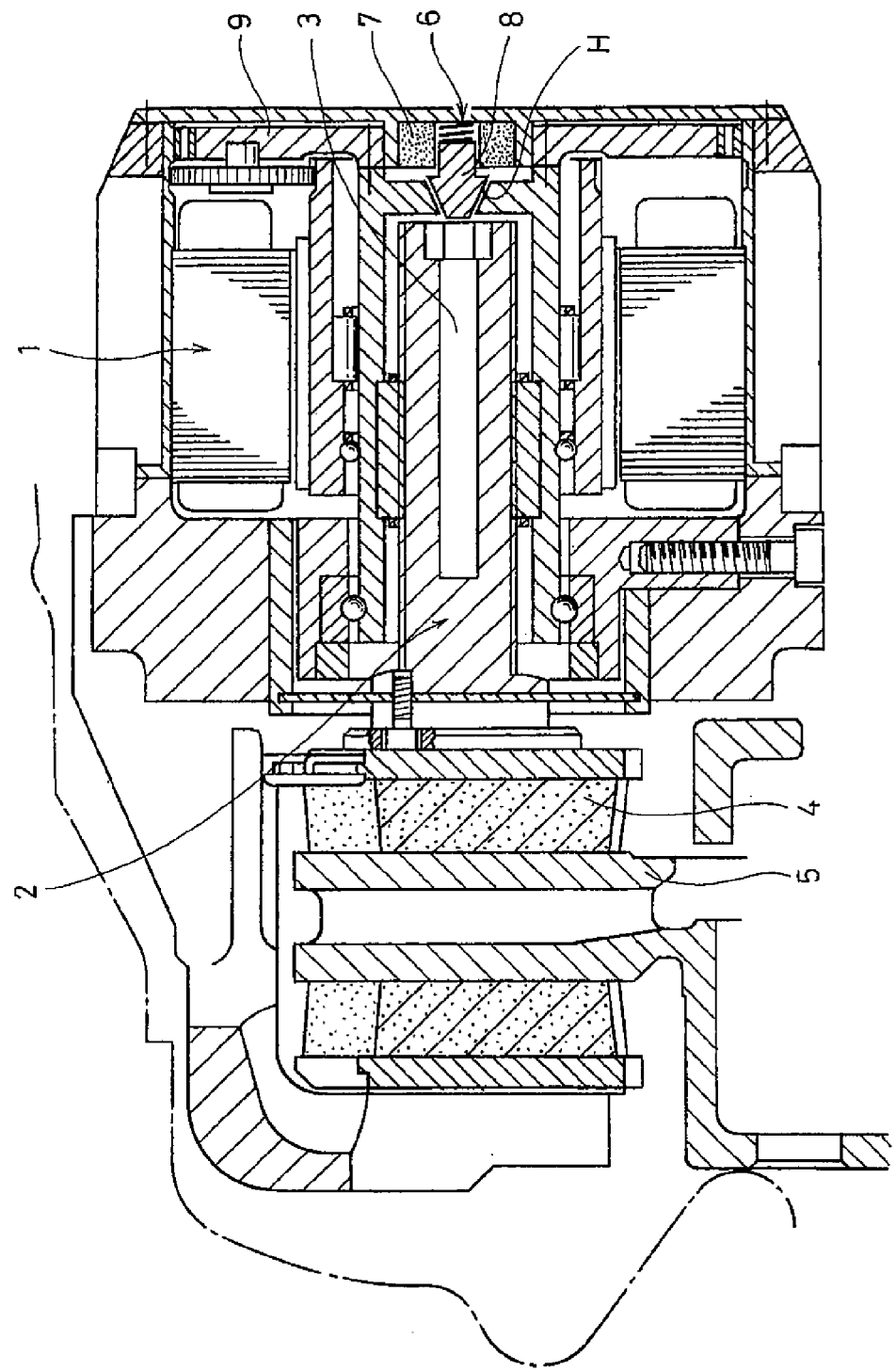
FIG. 9 is a sectional view of a different conventional arrangement.

In the embodiment and in Example 1, the engaging member is configured to be brought into engagement with the speed reduction mechanism 12, but may be brought into engagement with something other than the speed reduction mechanism 12. For example, the engaging member may be configured to be brought into engagement with linear motion mechanism 2 as shown in FIG. 9.

In the embodiment and in Example 1, the solenoid 13 of the locking mechanism 14 is a push type solenoid. However, it is apparent that the concept of the present invention is applicable to the conventional locking mechanism 6, which uses a pull type solenoid, because in this arrangement, it is possible to detect the inductance or induced current while the plunger is being pulled by the solenoid.

DESCRIPTION OF THE NUMERALS

10. Electric motor
11. Linear motion mechanism
12. Speed reduction mechanism
13. Solenoid
14. Locking mechanism
15. ECU
16a. Brake pad 16b. Brake pad
17. Outer ring member
18. Bearing member
50. Locking pin
52. Spring
53. Plunger
54. Intermediate gear
55. Magnet
56. Engaging hole
58. Pin hole
70. Solenoid driving DC power source
71. Displacement detecting means
72. Switch means
73. AC power source means
74. Voltage measuring means

What is claimed is:

1. An electric parking brake, wherein an electric motor is connected to a speed reduction mechanism through a linear motion mechanism, wherein a friction member mounted to the linear motion mechanism is configured to be pressed against a brake disk by rotating the electric motor, thereby generating a braking force, wherein with the braking force generated, an engaging member is configured to be moved to an engaged position where the engaging member is engaged in one of the linear motion mechanism and the speed reduction mechanism by a solenoid, wherein the electric parking brake comprises a monitor configured to detect a displacement of a plunger of the solenoid, and monitor a behavior of the engaging member based on the detected displacement, wherein the displacement is detected by detecting an inductance of the solenoid, and wherein a determination is made whether or not the engaging member has been moved to the engaged position based on the displacement of the plunger.

2. The electric parking brake of claim 1, wherein the plunger is provided with a magnet.

3. The electric parking brake of claim 1, wherein when the determination is made that the engaging member has been moved to the engaged position, the monitor is configured to reduce a driving current supplied to the solenoid to zero or below a predetermined value, measure the displacement, and make a determination whether the engaging member has been moved to an engaged state based on the measured displacement.

4. The electric parking brake of claim 1, wherein the displacement is detected to control a rotational angle of the electric motor, when the engaging member is disengaged from the one of the linear motion mechanism and the speed reduction mechanism.

5. The electric parking brake of claim 1, wherein a moving speed of the plunger is calculated from the displacement as detected, and wherein a voltage to be applied to the solenoid is controlled based on the calculated moving speed of the plunger.

6. The electric parking brake of claim 1, wherein sliding properties of the plunger are detected based on the displacement as detected, and wherein a control time necessary for operation is set based on the sliding properties as detected.

7. The electric parking brake of claim 1, wherein the displacement as detected is compared with a predetermined value, and wherein an alarm signal indicative of malfunction is generated if the displacement as detected becomes inferior to the predetermined value.

8. The electric parking brake of claim 1, wherein the displacement is detected by applying a minute current which is incapable of bringing the engaging member into engagement with the one of the linear motion mechanism and the speed reduction mechanism to the solenoid, while the solenoid is deactivated, and wherein sliding properties of the plunger are periodically monitored based on the displacement as detected.

9. An electric parking brake, wherein an electric motor is connected to a speed reduction mechanism through a linear motion mechanism, wherein a friction member mounted to the linear motion mechanism is configured to be pressed against a brake disk by rotating the electric motor, thereby generating a braking force, wherein with the braking force generated, an engaging member is configured to be moved to an engaged position where the engaging member is engaged in one of the linear motion mechanism and the speed reduction mechanism by a solenoid, wherein the electric parking brake comprises a monitor configured to detect a displacement of a plunger of the solenoid, and monitor a behavior of the engaging member based on the detected displacement, wherein the displacement is detected by detecting an induced current of the solenoid, and wherein a determination is made whether or not the engaging member has been moved to the engaged position based on the displacement of the plunger.

10. An electric parking brake, wherein an electric motor is connected to a speed reduction mechanism through a linear motion mechanism, wherein a friction member mounted to the linear motion mechanism is configured to be pressed against a brake disk by rotating the electric motor, thereby generating a braking force, wherein with the braking force generated, an engaging member is configured to be moved to an engaged position where the engaging member is engaged in one of the linear motion mechanism and the speed reduction mechanism by means of a solenoid, wherein the electric parking brake comprises a monitor configured to detect a displacement of a plunger of the solenoid, and monitor a behavior of the engaging member based on the detected displacement, and wherein the plunger is provided with a magnet having magnetic poles oriented in a direction of magnetic fluxes generated in a solenoid coil.

* * * * *